(12) United States Patent
Mohite et al.

(10) Patent No.: US 12,159,456 B2
(45) Date of Patent: Dec. 3, 2024

(54) METHOD AND SYSTEM FOR IDENTIFICATION OF AGRO-PHENOLOGICAL ZONES AND UPDATION OF AGRO-PHENOLOGICAL ZONES

(71) Applicant: Tata Consultancy Services Limited, Mumbai (IN)

(72) Inventors: Jayantrao Mohite, Thane (IN); Suryakant Ashok Sawant, Thane (IN); Ankur Pandit, Thane (IN); Srinivasu Pappula, Hyderabad (IN); Mariappan Sakkan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 434 days.

(21) Appl. No.: 17/451,664

(22) Filed: Oct. 21, 2021

(65) Prior Publication Data
US 2022/0343099 A1      Oct. 27, 2022

(30) Foreign Application Priority Data

Apr. 21, 2021  (IN) .............................. 202121018449

(51) Int. Cl.
*G06V 20/10* (2022.01)
*G06T 7/70* (2017.01)

(52) U.S. Cl.
CPC .............. *G06V 20/188* (2022.01); *G06T 7/70* (2017.01); *G06T 2207/30188* (2013.01)

(58) Field of Classification Search
CPC .. G06V 20/188; G06V 10/761; G06V 10/762; G06V 10/82; G06V 20/13;
(Continued)

(56) References Cited

U.S. PATENT DOCUMENTS 11,776,071 B2 * 10/2023 Perry .................. G06V 20/188
                                                          382/110
2009/0017758 A1 * 1/2009 Dorneich ............... G06F 18/00
                                                          455/62
(Continued)

OTHER PUBLICATIONS

Imzahim A. Alwan et al., "Agro-Climatic Zones (ACZ) Using Climate Satellite data in Iraq Republic", Materials Science and Engineering, 2019, vol. 518, Issue: 2, IOP Science, https://iopscience.iop.org/article/10.1088/1757-899X/518/2/022034/pdf.
(Continued)

*Primary Examiner* — Gandhi Thirugnanam
(74) *Attorney, Agent, or Firm* — FINNEGAN, HENDERSON, FARABOW, GARRETT & DUNNER LLP (57) ABSTRACT

The disclosure herein relates to identification of agro-phenological zones. Further the disclosed method and system also shares techniques for updating of the identified/existing agro-phenological zones. In a diverse geographical domain (like India), in order to maximize the crop production (avoid crop failures) from the available resources and prevailing diverse climatic conditions it necessary to use the resources and technology to infer the best agriculture approach on an individual location. The invention enables identification of the agro-phenological zones based on satellite image, weather data, soil data and cloud free historical satellite data using several techniques that includes machine learning, time series analysis, heuristic time series analysis technique and clustering. Further the invention also discloses techniques to update the identified/existing agro-phenological zones using historic data of agro-phenological zones of satellite image.

13 Claims, 6 Drawing Sheets

(58) Field of Classification Search
CPC ............ G06T 7/70; G06T 2207/30188; G06T 2207/20081; G06T 7/11
See application file for complete search history.

(56) References Cited

U.S. PATENT DOCUMENTS

| | | | | |
|---|---|---|---|---|
| 2016/0105327 | A9* | 4/2016 | Cremonesi | G06N 5/022 703/13 |
| 2017/0083747 | A1* | 3/2017 | Guan | G06V 20/188 |
| 2019/0347836 | A1* | 11/2019 | Sangireddy | A01C 21/005 |
| 2020/0184214 | A1* | 6/2020 | Casas | G06N 3/006 |
| 2020/0226375 | A1* | 7/2020 | Albrecht | G01J 3/2823 |
| 2021/0042658 | A1* | 2/2021 | Sainani | G06F 16/248 |
| 2022/0343099 | A1* | 10/2022 | Mohite | G06V 10/82 |
| 2023/0076104 | A1* | 3/2023 | Hazell | G06Q 10/063 |
| 2023/0368342 | A1* | 11/2023 | Guan | G06T 7/10 |

OTHER PUBLICATIONS

C. Marais Sicre et al., "Contribution of multispectral (optical and radar) satellite images to the classification of agricultural surfaces," International Journal of Applied Earth Observation and Geoinformation, Feb. 2020, vol. 84, Elsevier, https://www.sciencedirect.com/sdfe/reader/pii/S0303243418308948/pdf.

Claudia M. Viana et al., "Long-Term Satellite Image Time-Series for Land Use/Land Cover Change Detection Using Refined Open Source Data in a Rural Region", Remote Sensing, May 2019, vol. 11, Issue: 2, MDPI, https://www.mdpi.com/2072-4292/11/9/1104.

Tracy Whelen et al., "Time-series classification of Sentinel-1 agricultural data over North Dakota", Remote Sensing of Environment, Feb. 2018, vol. 9, Issue: 5, pp. 411-420, Taylor and Francis Online, https://www.researchgate.net/publication/322892085_Time-series_classification_of_Sentinel-1_agricultural_data_over_North_Dakota/link/5af43738aca2720af9c5630a/download.

* cited by examiner

METHOD AND SYSTEM FOR IDENTIFICATION OF AGRO-PHENOLOGICAL ZONES AND UPDATION OF AGRO-PHENOLOGICAL ZONES

PRIORITY CLAIM

This U.S. patent application claims priority under 35 U.S.C. § 119 to: India Application No. 202121018449, filed on 21 Apr. 2021. The entire contents of the aforementioned application are incorporated herein by reference.

TECHNICAL FIELD

The disclosure herein generally relates to agro-phenological zones, and, more particularly, to method and system for identification of agro-phenological zones. Further the disclosed method and system also shares techniques for updating of the identified agro-phenological zones.

BACKGROUND

In the recent years, with the increasing demand for food production, there is a focus on need for sustainable, effective& efficient agricultural practices for farming. In order to maximize the food production (avoid crop failures) from the available resources and prevailing climatic conditions in a diverse geographical location like India there is need to use the resources and technology based on the location.

As a first step to sustainable location based agriculture, a plurality of Argo-ecological zones has been defined by various agencies/organizations. An Argo-ecological zone is the land unit carved out of an Argo-climatic zone superimposed on a landform, that acts as modifier to climate and length of growing period, wherein the "Agro-climatic zone" is a land unit in terms of major climates, suitable for a certain range of crops and cultivars. The Agro-climatic conditions mainly refer to soil types, rainfall, temperature and water availability which influence the type of vegetations.

The state of art Argo-ecological are defined based on available climate datasets only while not exhaustively considering other possible resources like the satellite data or historic data or soil factors or crops or intensity or phenology in agriculture. Further there is also a driving need to update the identified Argo-ecological zones over a period of time, since the climatic conditions are constantly changing and in addition, cropping patterns have also been modified over a period of time to allow for more productivity of crops.

SUMMARY

Embodiments of the present disclosure present technological improvements as solutions to one or more of the above-mentioned technical problems recognized by the inventors in conventional systems. For example, in one embodiment, a method for identification of agro-phenological zones and updating of agro-phenological zones is provided. The method includes receiving a plurality of inputs associated with crop details, wherein the plurality of inputs comprises a plurality of satellite image, a plurality of weather data, a plurality of soil data, a plurality of cloud free historical satellite data, wherein each satellite image of the plurality of satellite image comprises a plurality of pixels, and wherein each pixel from amongst the plurality of pixels is associated with a location and a spatial resolution. The method further includes preprocessing the plurality of satellite images, a plurality of weather data, a plurality of soil data based on a set of pre-processing techniques to obtain a time-series representations comprising of a time series satellite images, a time series weather data and a time series soil data. The method further includes identifying at least one crop that is grown in for each pixel from the plurality of pixels for each season for a year using the time series satellite images based on a machine learning technique. The method further includes determining a majority crop at each pixel from the plurality of pixels using the identified crop, wherein the majority crop is crop that is grown more often in the pixel and the majority crop is estimated based on computing a mode of the crop for a season from a pre-defined number of years for the pixel. The method further includes determining a phenology of the majority crop at each pixel from the plurality of pixels in each season for a year based on a time series analysis of the time series satellite images. The method further includes determining a cropping intensity at each of the pixel from the plurality of pixels for a plurality of years using the time series satellite images and the phenology of the majority crop based on a heuristic time series analysis technique. The method further includes re-arranging the majority crop, the phenology, the cropping intensity, a time series weather data and a time series soil data of each pixel within the plurality of pixels in the satellite image based on the spatial resolution of the pixels to obtain a plurality of re-arranged pixels. The method further includes estimating a degree of similarity between the plurality of re-arranged pixels, wherein all the pixels are compared to their neighboring pixels iteratively based on a similarity estimation technique. The method further includes clustering each pixels of the plurality of re-arranged pixels to identify an agro-phenological zone for each pixel of the plurality of re-arranged pixels based on a clustering technique. The method further includes updating the identified agro-phenological zone for each pixel of the plurality of re-arranged pixels based on a agro-phenological zone updating technique.

In another aspect, a system for identification of agro-phenological zones and updating of agro-phenological zones is provided. The system includes a memory storing instructions, one or more communication interfaces; and one or more hardware processors coupled to the memory via the one or more communication interfaces, wherein the one or more hardware processors are configured by the instructions to receive a plurality of inputs associated with crop details the plurality of inputs comprises a plurality of satellite image, a plurality of weather data, a plurality of soil data, a plurality of cloud free historical satellite data, wherein each satellite image of the plurality of satellite image comprises a plurality of pixels, and wherein each pixel from amongst the plurality of pixels is associated with a location and a spatial resolution. The one or more hardware processors are further configured by the instructions to preprocess the plurality of satellite images, a plurality of weather data, a plurality of soil data based on a set of pre-processing techniques to obtain a time-series representations comprising of a time series satellite images, a time series weather data and a time series soil data. The one or more hardware processors are further configured by the instructions to identify at least one crop that is grown in for each pixel from the plurality of pixels for each season for a year using the time series satellite images based on a machine learning technique. The one or more hardware processors are further configured by the instructions to determine a majority crop at each pixel from the plurality of pixels using the identified crop, wherein the majority crop is crop that is grown more often in the pixel and the majority crop is estimated based on computing a mode of the crop for a season from a pre-defined number of years for the pixel. The one or more hardware processors are further configured by the instructions to determine a phenology of the majority crop at each pixel from the plurality of pixels in each season for a year based on a time series analysis of the time series satellite images. The one or more hardware processors are further configured by the instructions to determine a cropping intensity at the each pixel from the plurality of pixels for a plurality of years using the time series satellite images and the phenology of the majority crop based on a heuristic time series analysis technique. The one or more hardware processors are further configured by the instructions to re-arrange the majority crop, the phenology, the cropping intensity, a time series weather data and a time series soil data of each pixel within the plurality of pixels in the satellite image based on the spatial resolution of the pixels to obtain a plurality of re-arranged pixels. The one or more hardware processors are further configured by the instructions to estimate a degree of similarity between the plurality of re-arranged pixels wherein all the pixels are compared to their neighboring pixels iteratively based on a similarity estimation technique. The one or more hardware processors are further configured by the instructions to cluster each pixels of the plurality of re-arranged pixels to identify an agro-phenological zone for each pixel of the plurality of re-arranged pixels based on a clustering technique. The one or more hardware processors are further configured by the instructions to update the identified agro-phenological zone for each pixel of the plurality of re-arranged pixels based on a zone updating technique.

In yet another aspect, a non-transitory computer readable medium for identification of agro-phenological zones and updating of agro-phenological zones is provided. The program includes receiving a plurality of inputs associated with crop details, wherein the plurality of inputs comprises a plurality of satellite image, a plurality of weather data, a plurality of soil data, a plurality of cloud free historical satellite data, wherein each satellite image of the plurality of satellite image comprises a plurality of pixels, and wherein each pixel from amongst the plurality of pixels is associated with a location and a spatial resolution. The program further includes preprocessing the plurality of satellite images, a plurality of weather data, a plurality of soil data based on a set of pre-processing techniques to obtain a time-series representations comprising of a time series satellite images, a time series weather data and a time series soil data. The program further includes identifying at least one crop that is grown in for each pixel from the plurality of pixels for each season for a year using the time series satellite images based on a machine learning technique. The program further includes determining a majority crop at each pixel from the plurality of pixels using the identified crop, wherein the majority crop is crop that is grown more often in the pixel and the majority crop is estimated based on computing a mode of the crop for a season from a pre-defined number of years for the pixel. The program further includes determining a phenology of the majority crop at each pixel from the plurality of pixels in each season for a year based on a time series analysis of the time series satellite images. The program further includes determining a cropping intensity at each of the pixel from the plurality of pixels for a plurality of years using the time series satellite images and phenology of the majority crop based on a heuristic time series analysis technique. The program further includes re-arranging the majority crop, the phenology, the cropping intensity, a time series weather data and a time series soil data of each pixel within the plurality of pixels in the satellite image based on the spatial resolution of the pixels to obtain a plurality of re-arranged pixels. The program further includes estimating a degree of similarity between the plurality of re-arranged pixels, wherein all the pixels are compared to their neighboring pixels iteratively based on a similarity estimation technique. The program further includes clustering each pixels of the plurality of re-arranged pixels to identify an agro-phenological zone for each pixel of the plurality of re-arranged pixels based on a clustering technique. The program further includes updating the identified agro-phenological zone for each pixel of the plurality of re-arranged pixels based on a agro-phenological zone updating technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The agro-phenological zone is a cluster of locations that exhibits similar characteristics in terms of agricultural-phenological characteristics associated with farming. The agricultural-phenological characteristics includes parameters such as a crop, a phenological pattern, a cropping intensity, a rainfall trend and a soil composition. Phenology or crop phenology can be defined as a study of the timing of biological events in the crop across cultivation cycles governed by biotic, abiotic and crop management factors. The agriculture phenology includes identification of time of start of the season, peak of the growing season and end of the growing season over a region. Further, a length of a season can be estimated from start and end of the season. Phenological analysis over the entire year (which covers multiple seasons) helps in estimating cropping intensity over a pixel in a satellite image.

The advantages of identification of agro-phenological zone includes:

(a) The information on agro-phenological zones can help recommending to farming community on which crops to grow, when to start growing the crops, which varieties and other advisory for maximizing the production and reducing the crop loss.

(b) The information on agro-phenological zones can help farming community to select the short or long duration crop varieties as the length of season is subject to changing climate.

(c) The agro-insurance sector would benefit largely as the risk of crop failure is reduced due to updated information on agro-phenological zones.

Referring now to the drawings, and more particularly to FIG. 1 through FIG. 4 where similar reference characters denote corresponding features consistently throughout the figures, there are shown preferred embodiments and these embodiments are described in the context of the following exemplary system and/or method.

Figure 1:
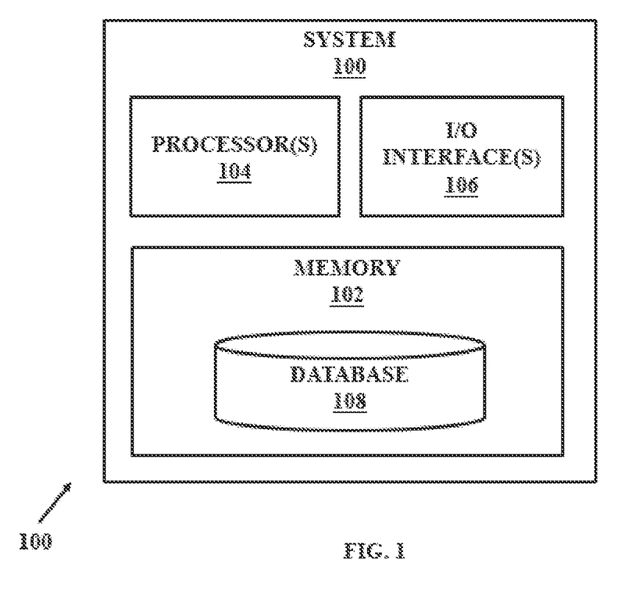
FIG. 1 illustrates an exemplary system for identification of agro-phenological zones and updating of agro-phenological zones according to some embodiments of the present disclosure.

FIG. 1 is a functional block diagram of a system 100 for identification of agro-phenological zones and updating of agro-phenological zones in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a database 108, which may store data related to agricultural domain, crops, satellite data and so on. Thus, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of system 100 are explained in conjunction with functional overview of the system 100 in FIG. 2 and flow diagram of FIGS. 3A, 3B and 3C for identification of agro-phenological zones and updating of agro-phenological zones.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
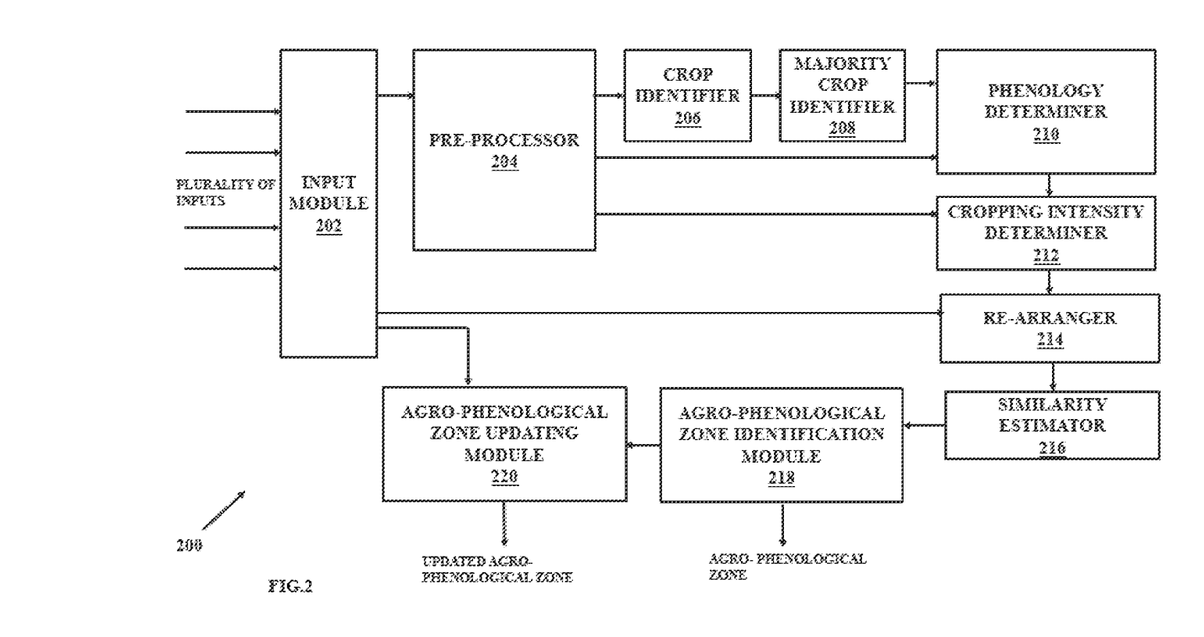
FIG. 2 is a functional block diagram for identification of agro-phenological zones and updating of agro-phenological zones according to some embodiments of the present disclosure.

FIG. 2 is a functional block diagram of the system of FIG. 1, in accordance with some embodiments of the present disclosure. As depicted in the system 200 of the FIG. 2, the functions of the components of the system 100 are illustrated that includes for identification of agro-phenological zones and updating of agro-phenological zones.

The system 200 for identification of agro-phenological zones and updating of agro-phenological zones is configured for receiving a plurality of inputs associated with crop details, via a one or more input module 202.

The plurality of inputs comprises a plurality of satellite image, a plurality of weather data, a plurality of soil data, a plurality of cloud free historical satellite data. Each satellite image of the plurality of satellite image comprises a plurality of pixels, and wherein each pixel from amongst the plurality of pixels is associated with a location and a spatial resolution The system 200 further comprises a pre-processor 204 configured for preprocessing the plurality of inputs based on a set of pre-processing techniques.

The plurality of satellite images, a plurality of weather data, a plurality of soil data are pre-processed to obtain a time-series representations comprising of a time series satellite images, a time series weather data and a time series soil data.

The system 200 further comprises a crop identifier 206 configured for identifying at least one crop that is grown in for each pixel from the plurality of pixels for each season for a year. The at least one crop is identified using the time series satellite images based on a machine learning technique.

The system 200 further comprises a majority crop identifier 208 configured for determining a majority crop at each pixel from the plurality of pixels. The majority crop is determined using the identified crop, wherein the majority crop is crop that is grown more often in the pixel. The majority crop is estimated based on computing a mode of the crop for a season from a pre-defined number of years for the pixel.

The system 200 further comprises a phenology determiner 210 configured for determining a phenology of the majority crop at each pixel from the plurality of pixels in each season for a year. The phenology of the majority crop is determined based on a time series analysis of the time series satellite images.

The system 200 further comprises a cropping intensity determiner 212 configured for determining a cropping intensity at each pixel from the plurality of pixels for a plurality of years. The cropping intensity is determined using the time series satellite images and the phenology of the majority crop based on a heuristic time series analysis technique.

The system 200 further comprises a re-arranger 214 configured for re-arranging the majority crop, the phenology, the cropping intensity, a time series weather data and a time series soil data of each pixel within the plurality of pixels in the satellite image. The re-arranging is implemented based on the spatial resolution of the pixels to obtain a plurality of re-arranged pixels.

The system 200 further comprises a similarity estimator 216 configured for estimating a degree of similarity between the plurality of re-arranged pixels. All the pixels are compared to their neighboring pixels iteratively based on a similarity estimation technique.

The system 200 further comprises an agro-phenological zone identification module 218 configured for clustering each pixels of the plurality of re-arranged pixels to identify an agro-phenological zone for each pixel of the plurality of re-arranged pixels. The agro-phenological zone is identified based on a clustering technique.

The system 200 further comprises an agro-phenological zone updating module 220 configured for updating the identified agro-phenological zone for each pixel of the plurality of re-arranged pixels based on a agro-phenological zone updating technique.

The various modules of the system 100 for identification of agro-phenological zones and updating of agro-phenological zones are implemented as at least one of a logically self-contained part of a software program, a self-contained hardware component, and/or, a self-contained hardware component with a logically self-contained part of a software program embedded into each of the hardware component that when executed perform the above method described herein.

Figure 3A:
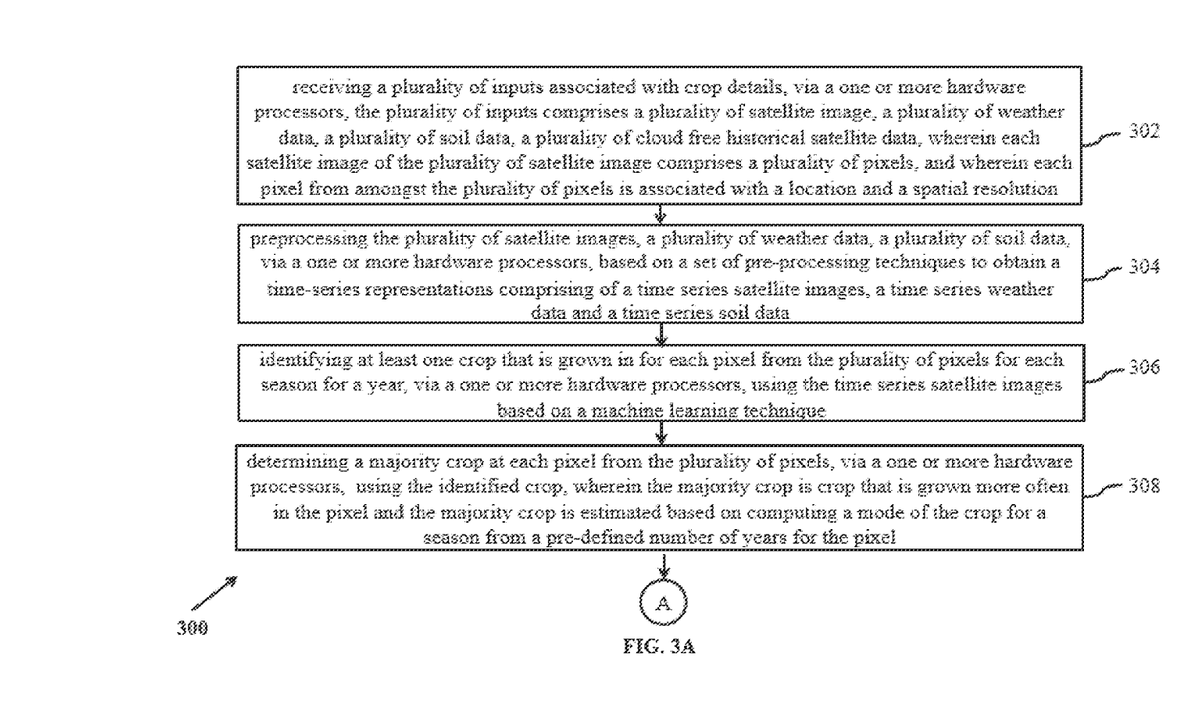
FIG. 3A, FIG. 3B and FIG. 3C is a flow diagram illustrating a method for identification of agro-phenological zones and updating of agro-phenological zones in accordance with some embodiments of the present disclosure.
Figure 3B:
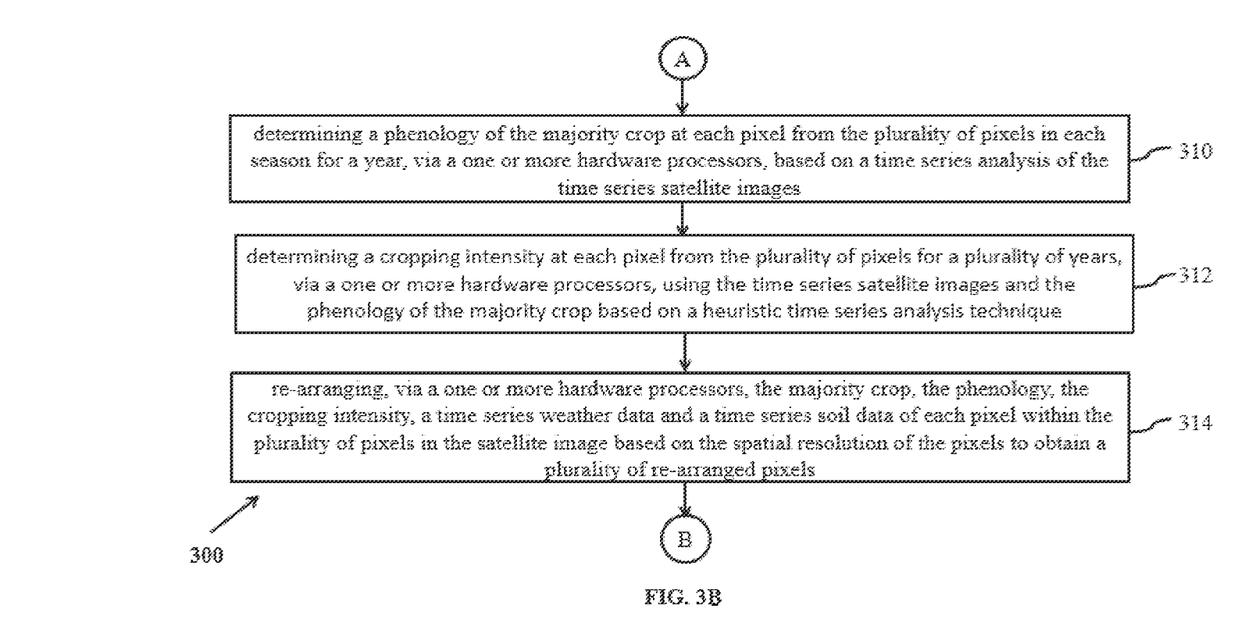
Figure 3C:
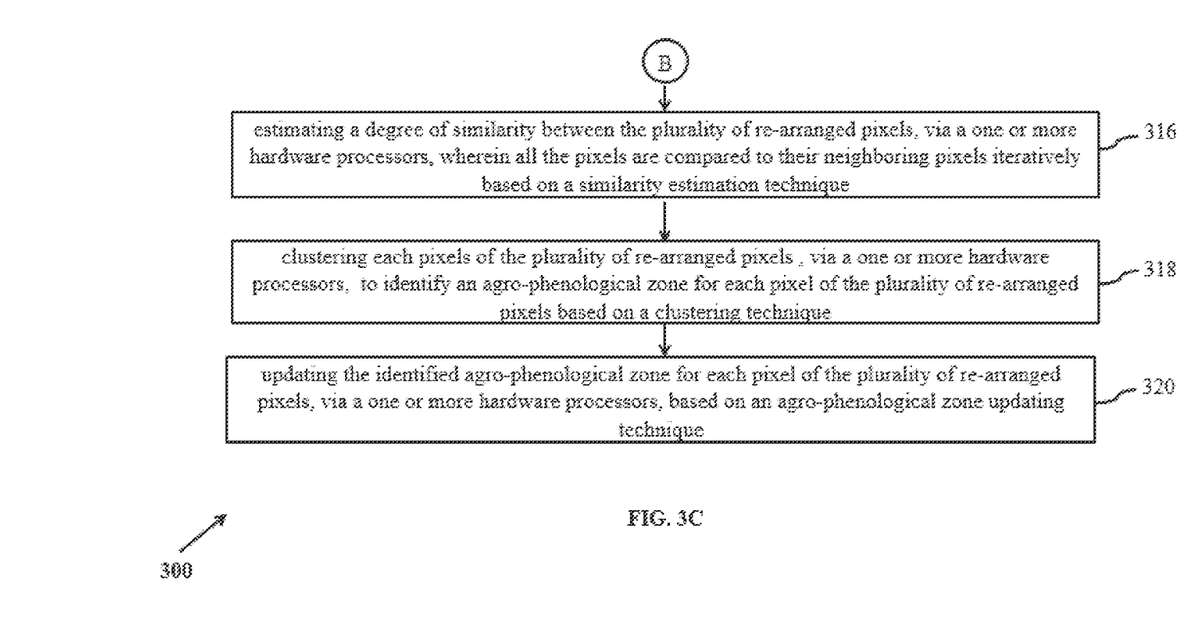

Functions of the components of the system 100 are explained in conjunction with functional modules of the system 100 stored in the memory 102 and further explained in conjunction with flow diagram of FIG. 3A, FIG. 3B and FIG. 3C. The FIG. 3A, FIG. 3B and FIG. 3C with reference to FIG. 1, is an exemplary flow diagram illustrating a method 300 for using the system 100 of FIG. 1 according to an embodiment of the present disclosure.

The steps of the method of the present disclosure will now be explained with reference to the components for identification of agro-phenological zones and updating of agro-phenological zones (100) and the modules (202-220) as depicted in FIG. 2 and the flow diagrams as depicted in FIG. 3A, FIG. 3B and FIG. 3C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a plurality of inputs is received at the one or more input module 202. The plurality of inputs is associated with crop details and comprises a plurality of satellite image, a plurality of weather data, a plurality of soil data, a plurality of cloud free historical satellite data. Each satellite image of the plurality of satellite image comprises a plurality of pixels, wherein each pixel from amongst the plurality of pixels is associated with a location and a spatial resolution.

In an embodiment, the plurality of weather data includes parameters associated with climatic details of the location such as such as temperature, humidity, rainfall, and so on. The historical and current satellite data consists of information in multiple spectral wavelengths such as blue, green, red, red edge, near infrared, shortwave infrared, etc. The plurality of soil data includes parameters associated with soil details of the location such as soil texture, soil depth, and so on.

At the next step 304, the method (300) includes preprocessing the plurality of inputs based on a set of pre-processing techniques. During the pre-processing the plurality of satellite images, a plurality of weather data, a plurality of soil data are pre-processed to obtain a time-series representations comprising of a time series satellite images, a time series weather data and a time series soil data.

In an embodiment, the set of pre-processing techniques comprises of several steps based on a format of the plurality of inputs, wherein the several steps includes imputation of missing values, estimation of some derived inputs using the set of pre-processing techniques that includes a moving average technique, a temporal maxima, a cloud flag layer data from a satellite image provider.

Considering an example scenario, the plurality of satellite images is preprocessed based on Satellite image preprocessing mainly involves atmospheric correction i.e. conversion of Digital Number (DN) values to Surface reflectance. For pre-processing satellite data, the during the presence of cloud, the cloud is masked clouds to remove noisy data. Further preprocessing the plurality of weather data mainly involves filling of missing values using technique such as moving average, and the preprocessing also involves estimation of parameters such as accumulated rainfall, average temperature etc. Further preprocessing of plurality of soil data involves filling of missing values using spatial interpolation technique such as Inverse Distance Weighting (IDW), Krigging etc.

At the next step 306, the method (300) includes identifying at least one crop that is grown in for each pixel from the plurality of pixels for each season for a year in the crop identifier 206. The crop is identified using the time series satellite images based on a machine learning technique.

In an embodiment, the machine learning technique comprises one of a support vector machine (SVM), a deep neural network, and a Random forest. Considering an example scenario one/combination of the machine learning technique is utilized to detect the crop using the multiple satellite images available during each crop season. A Machine Learning (ML) model will be trained using one/combination of the classifiers (SVM, deep neural network or random forest) and then the trained ML model would be applied on entire satellite data to detect the crop type on every pixel within the image.

At the next step 308, the method (300) includes determining a majority crop at each pixel from the plurality of pixels at the majority crop identifier 208. The majority crop is determined using the identified crop.

The majority crop is defined as the crop that is grown more often in the pixel. Further the majority crop is estimated based on computing a mode of the crop for a season from a pre-defined number of years for the pixel.

In an embodiment, the majority crop is estimated based on computing a mode of the crop for a season from a pre-defined number of years for the pixel. The determination of the majority crop is can be expressed as shown below:

Majority Crop=$f(Cs1,Cs2,Cs3 \ldots Csn)$

Wherein,
Cs1 is a crop at a particular pixel during season s1 of a particular year
Cs2, C3 . . . Csn—is the crops at the same pixel during earlier year season s2, s3, sn and so on.

At the next step 310, the method (300) includes determining a phenology of the majority crop at each pixel from the plurality of pixels in each season for a year in the phenology determiner 210. The phenology of the majority crop based on a time series analysis of the time series satellite images In an embodiment, the time series analysis comprises one of identification of a local minima and an accumulated slope parameter value slope. In an example scenario how time series analysis is performed in steps that includes plotting the timeseries based on a plurality of pixel values (available at different times during a cropping season), applying time-series smoothing and outlier removal techniques and identifying a local minima and an accumulated slope parameter value slope from the smoothed and noise-free time series.

At the next step 312, the method (300) includes determining a cropping intensity at each pixel from the plurality of pixels for a plurality of years, via the cropping intensity determiner 212. The cropping intensity is determined using the time series satellite images and the phenology of the majority crop based on a heuristic time series analysis technique.

In an embodiment, the heuristic time series analysis technique comprises identification of peaks from the phenology. In an example scenario the heuristic time series analysis technique is implemented in several steps that include plotting the data for a pixel from the time series satellite images during a cropping season based on the pixel values available at different times during a cropping season. Further time-series smoothing techniques, outlier removal techniques and noise-free time series techniques is applied to identify the local minima and an accumulated slope parameter value slope to finally determine the cropping intensity.

At the next step 314, the method (300) includes re-arranging, via the re-arranger 214, wherein the parameters re-arranged include the majority crop, the phenology, the cropping intensity, a time series weather data and a time series soil data of each pixel within the plurality of pixels in the satellite image. The re-arranging is implemented based on the spatial resolution of the pixels to obtain a plurality of re-arranged pixels.

The parameters (the majority crop, the phenology, the cropping intensity, a time series weather data and a time series soil data) have a different spatial resolution associated in each pixel within the plurality of pixels in the satellite image. Hence to the parameters are stacked in layers to obtain a similar spatial resolution. In an embodiment, techniques such as raster resampling is used to defined spatial resolution and re-arrange to obtain a plurality of re-arranged pixels.

At the next step 316, the method (300) includes estimating a degree of similarity between the plurality of re-arranged pixels, via the similarity estimator 216. For the step of estimating a degree of similarity, the pixels are compared to their neighboring pixels iteratively based on a similarity estimation technique.

In an embodiment, the similarity estimation technique comprises one of a Euclidean or a Manhattan distance, a Pairwise pixel similarity technique. In an example scenario the degree of similarity (DegSim) is expressed as shown below:

DegSim=$f(P1,P2)$

Wherein;
P1 represents a plurality of parameters including the crop, the crop intensity and so on for a pixel 1; and
P2 represents a plurality of parameters including the crop, the crop intensity and so on for a pixel 2.

At the next step 318, the method (300) includes clustering each pixels of the plurality of re-arranged pixels, via the agro-phenological zone identification module 218. The pixels are clustered to identify an agro-phenological zone for each pixel of the plurality of re-arranged pixels based on a clustering technique.

In an embodiment, the clustering technique comprises one of a K-means and a hierarchical clustering technique. In an example scenario, the plurality of re-arranged pixels is a stacked layer containing majority crop, phenology, cropping intensity, rainfall data etc. The clustering is initiated with a pre-defined value for k, wherein considering an example where k is defined as 7 clusters and then iteratively optimized on the number of clusters to identify the agro-phenological zones.

The identified agro-phenological zone can be displayed to a user as an output. Further the disclosure also discloses method to update the identified agro-phenological zone which is shared in detail in the further sections. The method disclosed for updating the identified agro-phenological zone can be used for even existing state of art agro-phenological zones identified by other organizations too, hence the terms identified agro-phenological zone and the agro-phenological zone are used inter-changeable in the next sections.

At the next step 320, the method (300) includes updating the identified agro-phenological zone for each pixel of the plurality of re-arranged pixels, via the agro-phenological zone updating module 220. The identified agro-phenological zone is updated based on an agro-phenological zone updating technique.

Figure 4:
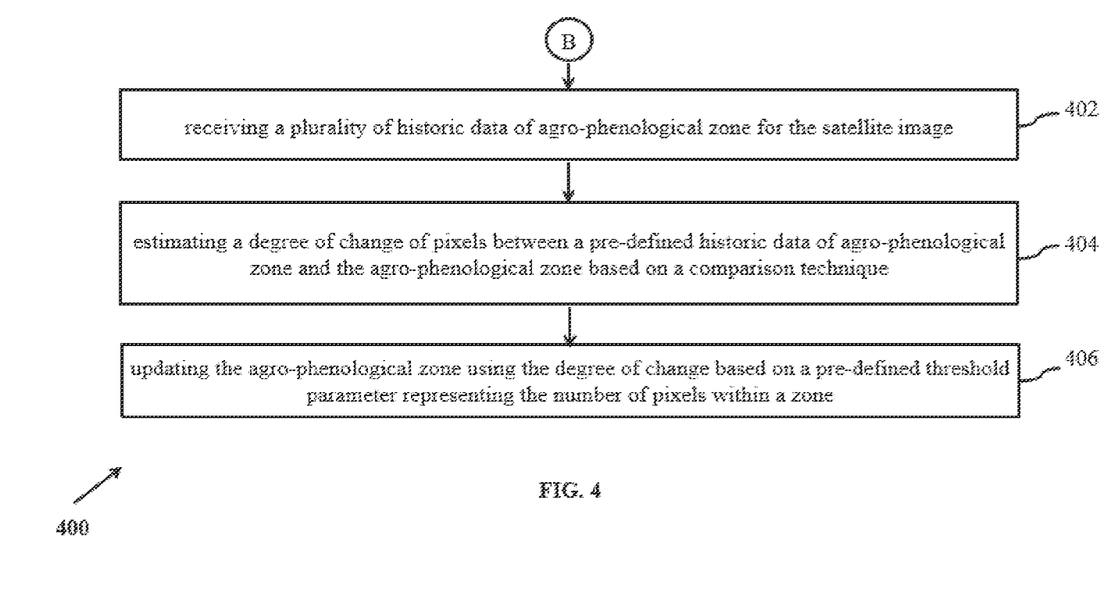
FIG. 4 is a flow diagram illustrating a method for updating of the identified agro-phenological zones in accordance with some embodiments of the present disclosure.

In an embodiment, the agro-phenological zone updating technique is explained using the flowchart 400 of FIG. 4 wherein:

At step 402 of the method 400, a plurality of historic data of agro-phenological zone for the satellite image is received at the agro-phenological zone updating module 220.

In an embodiment, the historic data of agro-phenological zone includes one of the identified agro-phenological zones or an existing agro-phenological zone.

At the next step 404, the method 400 includes estimating a degree of change of pixels between a pre-defined historic data of agro-phenological zone and the agro-phenological zone. The degree of change of pixels is estimated based on a comparison technique.

In an embodiment, the comparison technique includes differencing—thresholding, image ratioing and thresholding and so on, wherein a difference term is identified between the pixels from a base zone and an updated available information. The base zone (or baseline zone) is the identified agro-phenological zone/existing agro-phenological zone that should be updated. Further the thresholding can be further used to see change happened due to the added information from current cropping season.

At the next step 406, the method includes updating the agro-phenological zone using the degree of change based on a pre-defined threshold parameter representing the number of pixels within the agro-phenological. The pre-defined threshold parameter is dynamically determined based on the satellite image is received (in step 402) and the pixels from the base zone. In an example scenario, the pre-defined threshold parameter is defined as numerical value "5".

In an embodiment, the degree of change is expressed as shown below:

DegChange=$f(Z0,L1)$

Z0—is a baseline zone
L1—Layers such as the crop, the crop intensity, the phenology etc.

The updated agro-phenological zone can be displayed to a user as an output along with the identified agro-phenological zone or an existing agro-phenological zone.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
receiving a plurality of inputs associated with crop details, via a one or more hardware processors, the plurality of inputs comprises a plurality of satellite image, a plurality of weather data, a plurality of soil data, a plurality of cloud free historical satellite data, wherein each satellite image of the plurality of satellite image comprises a plurality of pixels, and wherein each pixel from amongst the plurality of pixels is associated with a location and a spatial resolution;
preprocessing the plurality of satellite images, a plurality of weather data, a plurality of soil data, via the one or more hardware processors, based on a set of pre-processing techniques to obtain a time-series representations comprising of a time series satellite images, a time series weather data and a time series soil data;
identifying at least one crop that is grown in for each pixel from the plurality of pixels for each season for a year, via the one or more hardware processors, using the time series satellite images based on a machine learning technique;
determining a majority crop at each pixel from the plurality of pixels, via the one or more hardware processors, using the identified crop, wherein the majority crop is crop that is grown more often in the pixel and the majority crop is estimated based on computing a mode of the crop for a season from a pre-defined number of years for the pixel;
determining a phenology of the majority crop at each pixel from the plurality of pixels in each season for a year, via the one or more hardware processors, based on a time series analysis of the time series satellite images;
determining a cropping intensity at the each pixel from the plurality of pixels for a plurality of years, via the one or more hardware processors, using the time series satellite images and the phenology of the majority crop based on a heuristic time series analysis technique, wherein the heuristic time series analysis technique comprises identification of peaks from the phenology by:
- plotting data for each pixel from the time series satellite images during a cropping season based on pixel values available at different times during the cropping season; and
- applying a time-series smoothing techniques, an outlier removal techniques and a noise-free time series techniques to identify a local minima and an accumulated slope parameter value slope to determine the cropping intensity;

re-arranging, via the one or more hardware processors, the majority crop, the phenology, the cropping intensity, a time series weather data and a time series soil data of each pixel within the plurality of pixels in the satellite image based on the spatial resolution of the pixels to obtain a plurality of re-arranged pixels, wherein the parameters have a different spatial resolution associated in each pixel within the plurality of pixels in the satellite image, and wherein the parameters are stacked in layers using raster resampling to define and rearrange the spatial resolution for obtaining the plurality of re-arranged pixels;

estimating a degree of similarity between the plurality of re-arranged pixels, via the one or more hardware processors, wherein all the pixels are compared to their neighboring pixels iteratively based on a similarity estimation technique;

clustering each pixel of the plurality of re-arranged pixels, via the one or more hardware processors, to identify an agro-phenological zone for each pixel of the plurality of re-arranged pixels based on a clustering technique; and updating the identified agro-phenological zone for each pixel of the plurality of re-arranged pixels, via the one or more hardware processors, based on a agro-phenological zone updating technique.

2. The method of claim 1, wherein the agro-phenological zone updating technique comprises of:
- receiving a plurality of historic data of agro-phenological zone for the satellite image;
- estimating a degree of change of pixels between a pre-defined historic data of agro-phenological zone and the agro-phenological zone based on a comparison technique; and
- updating the agro-phenological zone using the degree of change based on a pre-defined threshold parameter representing the number of pixels within the agro-phenological zone.

3. The method of claim 1, wherein the agro-phenological zone is a cluster of locations that exhibits similar characteristics in terms of agricultural-phenological characteristics associated with farming and includes parameters such as a crop, a phenological pattern, a cropping intensity, a rainfall trend and a soil composition.

4. The method of claim 1, wherein the set of pre-processing techniques comprises of several steps based on a format of the plurality of inputs, wherein the several steps include imputation of missing values using spatial interpolation technique comprising an inverse Distance Weighting (IDW) and Kriging, estimation of some derived inputs using the set of pre-processing techniques that includes a moving average technique, a temporal maxima, a cloud flag layer data from a satellite image provider.

5. The method of claim 1, wherein the machine learning technique comprises one of a support vector machine (SVM), a deep neural network, and a Random forest.

6. The method of claim 1, wherein the similarity estimation technique comprises one of a Euclidean or a Manhattan distance, a Pairwise pixel similarity technique etc.

7. The method of claim 1, wherein the clustering technique comprises one of a K-means and a hierarchical clustering technique.

8. A system, comprising:
- an input/output interface;
- one or more memories; and
- one or more hardware processors, the one or more memories coupled to the one or more hardware processors, wherein the one or more hardware processors are configured to execute programmed instructions stored in the one or more memories, to:
  - receive a plurality of inputs associated with crop details, via the one or more hardware processors, the plurality of inputs comprises a plurality of satellite image, a plurality of weather data, a plurality of soil data, a plurality of cloud free historical satellite data, wherein each satellite image of the plurality of satellite image comprises a plurality of pixels, and wherein each pixel from amongst the plurality of pixels is associated with a location and a spatial resolution;
  - preprocess the plurality of satellite images, a plurality of weather data, a plurality of soil data, via the one or more hardware processors, based on a set of pre-processing techniques to obtain a time-series representations comprising of a time series satellite image, a time series weather data and a time series soil data;
  - identify at least one crop that is grown in for each pixel from the plurality of pixels for each season for a year, via the one or more hardware processors, using the time series satellite images based on a machine learning technique;
  - determine a majority crop at each pixel from the plurality of pixels, via the one or more hardware processors, using the identified crop, wherein the majority crop is crop that is grown more often in the pixel and the majority crop is estimated based on computing a mode of the crop for a season from a pre-defined number of years for the pixel;
  - determine a phenology of the majority crop at each pixel from the plurality of pixels in each season for a year, via the one or more hardware processors, based on a time series analysis of the time series satellite images;
  - determine a cropping intensity at each pixel from the plurality of pixels for a plurality of years, via the one or more hardware processors, using the time series satellite images and the phenology of the majority crop based on a heuristic time series analysis technique, wherein the heuristic time series analysis technique comprises identification of peaks from the phenology by:
    - plotting data for each pixel from the time series satellite images during a cropping season based on pixel values available at different times during the cropping season; and
    - applying a time-series smoothing techniques, an outlier removal techniques and a noise-free time series techniques to identify a local minima and an accumulated slope parameter value slope to determine the cropping intensity;

re-arrange, via the one or more hardware processors, the majority crop, the phenology, the cropping intensity, a time series weather data and a time series soil data of each pixel within the plurality of pixels in the satellite image based on the spatial resolution of the pixels to obtain a plurality of re-arranged pixels, wherein the parameters have a different spatial resolution associated in each pixel within the plurality of pixels in the satellite image, and wherein the parameters are stacked in layers using raster resampling to define and rearrange the spatial resolution for obtaining the plurality of re-arranged pixels;

estimate a degree of similarity between the plurality of re-arranged pixels, via the one or more hardware processors, wherein all the pixels are compared to their neighboring pixels iteratively based on a similarity estimation technique;

cluster each pixels of the plurality of re-arranged pixels, via the one or more hardware processors, to identify an agro-phenological zone for each pixel of the plurality of re-arranged pixels based on a clustering technique; and update the identified agro-phenological zone for each pixel of the plurality of re-arranged pixels, via the one or more hardware processors, based on a zone updating technique.

9. The system of claim 8, wherein the one or more hardware processors are configured by the instructions to perform the zone updating technique comprising of:

receiving a plurality of historic data of agro-phenological zone for the satellite image;

estimating a degree of change of pixels between a pre-defined historic data of agro-phenological zone and the agro-phenological zone based on a comparison technique; and updating the agro-phenological zone using the degree of change based on a pre-defined threshold parameter representing the number of pixels within a zone.

10. The system of claim 8, wherein the one or more hardware processors are configured by the instructions to perform the set of pre-processing techniques comprises of several steps based on a format of the plurality of inputs, wherein the several steps include imputation of missing values using spatial interpolation technique comprising an inverse Distance Weighting (IDW) and Kriging, estimation of some derived inputs using the set of pre-processing techniques that includes a moving average technique, a temporal maxima, a cloud flag layer data from a satellite image provider.

11. The system of claim 8, wherein the one or more hardware processors are configured by the instructions to perform the machine learning technique comprises one of a support vector machine (SVM), a deep neural network, and a Random forest.

12. The system of claim 8, wherein the one or more hardware processors are configured by the instructions to perform the similarity estimation technique comprises one of a Euclidean or a Manhattan distance, a Pairwise pixel similarity technique and the clustering technique comprises one of a K-means and a hierarchical clustering technique.

13. A computer program product comprising a non-transitory computer readable medium having a computer readable program embodied therein, wherein the computer readable program, when executed on a computing device, causes the computing device to:

receive a plurality of inputs associated with crop details, via a one or more hardware processors, the plurality of inputs comprises a plurality of satellite image, a plurality of weather data, a plurality of soil data, a plurality of cloud free historical satellite data, wherein each satellite image of the plurality of satellite image comprises a plurality of pixels, and wherein each pixel from amongst the plurality of pixels is associated with a location and a spatial resolution;

preprocess the plurality of satellite images, a plurality of weather data, a plurality of soil data, via the one or more hardware processors, based on a set of pre-processing techniques to obtain a time-series representations comprising of a time series satellite images, a time series weather data and a time series soil data;

identify at least one crop that is grown in for each pixel from the plurality of pixels for each season for a year, via the one or more hardware processors, using the time series satellite images based on a machine learning technique;

determine a majority crop at each pixel from the plurality of pixels, via the one or more hardware processors, using the identified crop, wherein the majority crop is crop that is grown more often in the pixel and the majority crop is estimated based on computing a mode of the crop for a season from a pre-defined number of years for the pixel;

determine a phenology of the majority crop at each pixel from the plurality of pixels in each season for a year, via the one or more hardware processors, based on a time series analysis of the time series satellite images;

determine a cropping intensity at the each pixel from the plurality of pixels for a plurality of years, via the one or more hardware processors, using the time series satellite images and the phenology of the majority crop based on a heuristic time series analysis technique, wherein the heuristic time series analysis technique comprises identification of peaks from the phenology by:

plotting data for each pixel from the time series satellite images during a cropping season based on pixel values available at different times during the cropping season; and applying a time-series smoothing techniques, an outlier removal techniques and a noise-free time series techniques to identify a local minima and an accumulated slope parameter value slope to determine the cropping intensity;

re-arrange, via the one or more hardware processors, the majority crop, the phenology, the cropping intensity, a time series weather data and a time series soil data of each pixel within the plurality of pixels in the satellite image based on the spatial resolution of the pixels to obtain a plurality of re-arranged pixels, wherein the parameters have a different spatial resolution associated in each pixel within the plurality of pixels in the satellite image, and wherein the parameters are stacked in layers using raster resampling to define and rearrange the spatial resolution for obtaining the plurality of re-arranged pixels;

estimate a degree of similarity between the plurality of re-arranged pixels, via the one or more hardware processors, wherein all the pixels are compared to their neighboring pixels iteratively based on a similarity estimation technique;

cluster each pixels of the plurality of re-arranged pixels, via the one or more hardware processors, to identify an agro-phenological zone for each pixel of the plurality of re-arranged pixels based on a clustering technique; and update the identified agro-phenological zone for each pixel of the plurality of re-arranged pixels, via the one or more hardware processors, based on a agro-phenological zone updating technique.

* * * * *